United States Patent
Tateyama et al.

[11] Patent Number: 6,031,026
[45] Date of Patent: Feb. 29, 2000

[54] PROCESS FOR THE CONTINUOUS PRODUCTION OF RTV SILICONE RUBBER COMPOSITIONS

[75] Inventors: Yuki Tateyama; Yoshiharu Konya, both of Annaka; Takao Kanaya, Chiyoda-ku, all of Japan

[73] Assignee: Shin-Etsu Chemical Co., Ltd., Tokyo, Japan

[21] Appl. No.: 09/095,768

[22] Filed: Jun. 12, 1998

[30] Foreign Application Priority Data

Jun. 13, 1997 [JP] Japan ................................. 9-173204

[51] Int. Cl.$^7$ ...................................................... C08K 3/36
[52] U.S. Cl. ......................... 523/340; 523/348; 524/863; 524/788; 528/17; 528/18; 528/34
[58] Field of Search ................................. 528/17, 18, 34; 524/788, 863; 523/340, 348

[56] References Cited

U.S. PATENT DOCUMENTS

| | | | |
|---|---|---|---|
| 4,386,003 | 5/1983 | Fiehler | 252/60 |
| 4,387,177 | 6/1983 | Mine et al. | 524/425 |
| 4,649,005 | 3/1987 | Kobayashi et al. | 264/101 |
| 4,737,561 | 4/1988 | Stary et al. | 528/14 |
| 5,266,631 | 11/1993 | Arai et al. | 524/847 |
| 5,674,936 | 10/1997 | Lucas | 524/731 |

Primary Examiner—Margaret G. Moore
Attorney, Agent, or Firm—Millen, White, Zelano & Branigan

[57] ABSTRACT

In a first step, a crosslinkable organopolysiloxane oil (2) is mixed with an inorganic filler (3) in a flow jet mixer (1) to form a flowing silicone rubber compound. In a second step, the silicone rubber compound is fed into a tank (6) equipped at the bottom with a vacuum discharge pump (8) and maintained in vacuum where the compound is continuously deaerated, and a thixotropy controlling agent (10) is then added and mixed with the compound in a mixer (9). In a third step, a crosslinking agent (12) is added and mixed with the silicone rubber compound in a KRC kneader (11), and the compound is degassed in a mixer (13). The process continuously produces an RTV silicone rubber composition which is anti-sagging and improved in applicability on use.

18 Claims, 1 Drawing Sheet

PROCESS FOR THE CONTINUOUS PRODUCTION OF RTV SILICONE RUBBER COMPOSITIONS

BACKGROUND OF THE INVENTION

1. Field of the Invention

This invention relates to a continuous process for producing room temperature vulcanizable (RTV) silicone rubber compositions, especially of the one-part type.

2. Prior Art

For the continuous production of RTV silicone rubber compositions, Stary et al., U.S. Pat. No. 4,737,561 proposed a process using a pilgrim-step kneader. This process involves a first step of mixing an organopolysiloxane oil, a filler (typically inorganic filler) and optional components in a closed mixer to form a silicone rubber compound and a second step of metering the remaining components into the compound in an oscillating pilgrim-step mixer where the mixture is homogenized and degassed. This process, however, has the problem that since the mixture in the second step becomes gel and sticks to the mixing machine, the machine must be frequently disassembled and cleaned. This results in a considerably low production efficiency.

It is thus desired to overcome the problems of prior art processes, that is, to provide a continuous process for producing an RTV silicone rubber composition, especially an RTV silicone rubber composition having anti-sagging properties in such a manner as to improve the efficiency of continuous production over the prior art processes. Since a composition of this type is typically contained in a container such as a cartridge or tube, it is further desired to improve the applicability (ease of discharging and anti-stringing) of the composition.

SUMMARY OF THE INVENTION

According to the invention, there is provided a continuous process for producing a room temperature vulcanizable silicone rubber composition. In a first step, a crosslinkable organopolysiloxane oil is mixed with an inorganic filler to form a flowing silicone rubber compound. In a second step, the silicone rubber compound is fed into a tank equipped at the bottom with a vacuum discharge pump and maintained in vacuum where the compound is continuously deaerated, and then a thixotropy controlling agent is added and mixed with the compound. In a third step, a crosslinking agent is added and mixed with the silicone rubber compound and the resulting compound is degassed.

Since the flowing silicone rubber compound is formed in the first step and the thixotropy controlling agent is blended and homogeneously mixed with the compound in a static or dynamic mixer in the second step, the dispersion of the filler is facilitated in the mixer of the first step and the compound becomes non-flowing at the end of the second step. The degassing of the compound in the third step is effective for suppressing the progress of gelation in the mixer by the curing component added in the third step and thus preventing the admixing of foreign matter in the product. In the third step of one preferred embodiment, the crosslinking agent and optionally, a condensation catalyst are first added and homogeneously mixed with the compound in a mixer with at least one shaft, capable of continuous mixing at a high speed, and thereafter, remixing and degassing are performed in a mixer or agitator-equipped tank having a mixing volume enough to provide at least the desired residence time. Then the product which is improved in applicability, especially in ease of discharging and anti-stringing can be effectively and continuously produced.

BRIEF DESCRIPTION OF THE DRAWINGS

The only FIGURE, FIG. 1 schematically illustrates a system for carrying out the process of the invention.

DETAILED DESCRIPTION OF THE INVENTION

Figure 1:
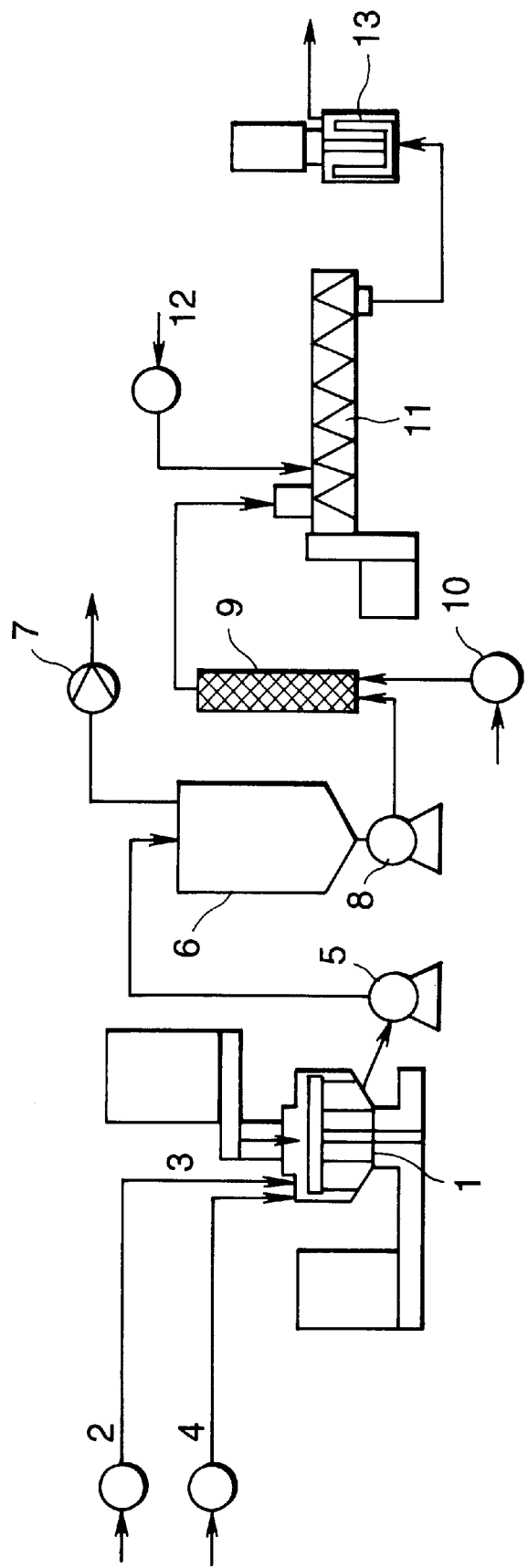

The continuous process for producing a room temperature vulcanizable silicone rubber composition according to the invention starts with a base oil which is a crosslinkable organopolysiloxane oil. The organopolysiloxane oil which can be used herein includes diorganopolysiloxanes having a hydroxyl (OH) group at one or both ends, preferably at both ends, as typified by $\alpha,\omega$-dihydroxyorganopolysiloxanes. They are represented by the following general formula (1).

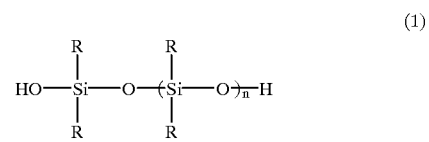

(1)

In formula (1), R represents the same or different, substituted or unsubstituted, monovalent hydrocarbon radicals having 1 to 18 carbon atoms, especially 1 to 6 carbon atoms. Letter n is such a number that the organopolysiloxane may have a viscosity of 10 to 1,000,000 centistokes (cs) at 25° C., especially 500 to 100,000 cs at 25° C. The radicals represented by R include alkyl radicals such as methyl, ethyl, propyl, butyl and hexyl, cycloalkyl radicals such as cyclohexyl, alkenyl radicals such as vinyl, allyl, propenyl, and butenyl, aryl radicals such as phenyl, tolyl and naphthyl, aralkyl radicals such as benzyl, and substituted ones thereof in which some or all of the hydrogen atoms are replaced by halogen atoms such as chlorine and fluorine, for example, 3,3,3-trifluoropropyl.

Preferably the organopolysiloxane oil used herein has a viscosity of 10 to 1,000,000 cs at 25° C. A base oil having a too high viscosity is hard and imposes an undesirably high load to the mixing machine. A base oil having a too low viscosity forms a siloxane base having poor physical properties. It is especially preferred that the viscosity is 500 to 100,000 cs at 25° C. (room temperature).

In the compositions of the invention, inorganic fillers are blended. Silica and calcium carbonate are often used as the inorganic filler.

The silica used herein includes wet silica and dry silica which may or may not be surface treated with silane coupling agents. The use of treated silica is recommended from the standpoints of total cost and physical properties. The silica should preferably have a BET specific surface area of at least 40 m²/g. Silica with a smaller specific surface area below this level is undesirable because a composition having that silica blended therein undergoes a slump and shows poor physical properties such as tensile and tear properties. Silica is preferably blended in amounts of about 5 to 30 parts per 100 parts by weight of the base oil. Compositions containing less than 5 parts of silica would undergo a slump and show poor physical properties such as tensile and tear properties whereas compositions containing more than 30 parts of silica would impose an undesirable load to the mixing machine and become less compatible in the subsequent steps.

The calcium carbonate which can be used herein has a mean particle size of 0.01 to 0.2 µm and a specific surface area which is as large as possible, preferably at least 10 m$^2$/g, and more preferably at least 25 m$^2$/g. Of the calcium carbonate, it is preferable to use colloidal calcium carbonate which has been treated with suitable treating agents as typified by saturated fatty acids having at least 11 carbon atoms such as stearic acid, unsaturated fatty acids having at least 11 carbon atoms such as linolic acid, and resin acids such as rhodinic acid, because improvements in hot-water resistance, heat resistance and durability are expectable. Preferably calcium carbonate is treated with at least 1.5% by weight (based on the weight of calcium carbonate) of the treating agent and more preferably 2.0 to 10% by weight of the treating agent for the ease of discharging and other reasons. Calcium carbonate is preferably blended in amounts of about 20 to 120 parts per 100 parts by weight of the base oil. Compositions containing lower amounts of calcium carbonate would undergo a slump and show poor physical properties such as tensile and tear properties whereas compositions containing too high amounts of calcium carbonate would impose an undesirable load to the mixing machine and give rise to problems in the subsequent steps.

To the compositions of the invention, thixotropy controlling agents, crosslinking agents and optionally, condensation catalysts, adhesion aids and discharge promoters are added.

Included in the thixotropy controlling agents are polyethers as typified by ethylene oxide (EO) and propylene oxide (PO), surfactants and reaction products thereof such as cationic and anionic surfactants, and fillers having —OH groups. For cost and other reasons, polyethers such as EO and PO are preferred. Polyethylene glycol, polypropylene glycol and triethylene glycol are exemplary. An appropriate amount of the thixotropy controlling agent added is about 0.005 to 5 parts by weight per 100 parts by weight of the base oil because extremely small amounts of the thixotropy controlling agent are not effective for controlling thixotropy, and too large amounts of the thixotropy controlling agent would adversely affect the ease of discharging and bonding force and tend to bleed out with time.

The crosslinking agents are organic silicon compounds having at least two hydrolyzable groups and partial hydrolyzates thereof. The number of hydrolyzable groups should be at least two and may be controlled in accordance with a particular application. Exemplary hydrolyzable groups are alkoxy, acetoxy, oxime, and propenoxy groups. Examples of the crosslinking agent include methyltrialkoxysilane, methyltriacetoxysilane, methylethylketoximesilane, and triisopropenoxysilane. An appropriate amount of the crosslinking agent added is about 2 to 20 parts by weight per 100 parts by weight of the base oil because compositions with too small amounts of the crosslinking agent would gel during preparation or storage, and too large amounts of the crosslinking agent would cause slump and produce brittle cured products.

The condensation catalysts are optional. When used, the condensation catalyst may be selected from metal alkoxides such as titanium alkoxides, tin chelates, and zirconium alkoxides and other compounds which can promote condensation reaction. The amount of the condensation catalyst added is preferably 0 to about 10 parts by weight per 100 parts by weight of the base oil.

If desired, discharge promoters are added to the compositions of the invention. Examples of the discharge promoter include non-reactive organopolysiloxanes having a low viscosity (typically a viscosity of 1 to 5,000 cs at 25° C.), reactive organosiloxanes having a low viscosity, non-siloxane oils such as liquid paraffin and other olefinic hydrocarbons, and non-reinforcing fillers such as hollow glass beads, mica, talc, and plastic beads. Other additives which are optionally added to the compositions of the invention include pigments for coloring, antibacterial agents, flame retardants, anti-discoloring agents, UV absorbers, rust preventives, and extending oils (e.g., non-silicone compounds).

According to the invention, an RTV silicone rubber composition, especially an RTV silicone rubber composition of the one-part type having anti-sagging properties is continuously prepared using the above-described components. In the first step, the base oil is mixed with the inorganic filler to form a flowing silicone rubber compound. In the first step, some optional components may also be blended. However, the addition of the component which causes the compound to lose fluidity is undesirable from the standpoints of the load on the mixer, heat release therein, and discharge therefrom. In this regard, it is recommended to avoid the blending of the thixotropy controlling agent, crosslinking agent and condensation catalyst in the first step.

For the mixing of the base oil with the filler and optional components, a continuous mixer 1 as shown in FIG. 1 is used whereby a homogeneous mixture is obtained. The mixer used in the first step may be selected from single shaft high speed rotating mixers, especially flow jet mixers and Henschel mixers. One commercially available, useful flow jet mixer is model MW-F-300S by Funken Pautex K.K. While the flow jet mixer is continuously operated at 200 to 1,200 rpm, desirably 300 to 1,000 rpm, the base oil and optionally, the discharge promoter are metered to the mixer 1 through lines 2 and 4, respectively, and at the same time, the filler is metered through a line 3 as shown in FIG. 1. If the rotational speed of the mixer is too high, the power load becomes too large, and the heat of agitation is generated to increase the temperature above the critical level of 80° C. above which there can occur the problem of gelation upon addition of the crosslinking agent, condensation catalyst and other components in the subsequent steps. A too low rotational speed would fail to achieve uniform mixing of the oil with the filler. It is thus recommended to maintain the mixer at a temperature below 80° C., especially below 60° C. The percent loading of the mixer is controlled to 5 to 50%, desirably 10 to 30% by the pressure at the discharge port. Too high percent loadings would increase the power load and the heat of agitation. Too low percent loadings would allow the short passage of the oil and filler through the discharge port, failing to achieve uniform mixing. To increase productivity under certain conditions of rotational speed and loading appropriate to form a uniform compound, it is advantageous that the compound has as low a viscosity as possible. Therefore, the compound obtained in the first step should preferably have a viscosity of about 100 to 5,000 centipoise (cp) at 25° C., especially about 500 to 3,000 cp at 25° C.

The second step includes the step of feeding the silicone rubber compound into a tank equipped at the bottom with a vacuum discharge pump and maintained in vacuum where the compound is continuously deaerated, and the step of adding the thixotropy controlling agent to the deaerated compound. The second step of feeding the thixotropy or flow controlling agent to the compound and mixing it with the compound into a homogeneous mixture in a static or dynamic mixer is not only effective for forming the non-flowing compound, but also contributes to enhancing the dispersion of the filler added in the first step. The second step of deaerating the compound is effective for restraining the progress of gelation of the compound in the mixer by the curing component added in the third step, thereby preventing the admixing of foreign matter in the product.

In the second step, the compound is fed from the mixer 1 to a tank 6 through a pump 5 as shown in FIG. 1. The pump 5 is of the gear or other type, has a discharge pressure of at least 5 kg/cm$^2$ gage and is capable of pumping a fluid having a temperature of 10 to 80° C. and a viscosity of 100 to 5,000 poises in a stable manner. The tank 6 has a volume of at least 20 liters and is maintained in a vacuum of 100 Torr or lower by means of a vacuum pump 7. Effective deaeration is achieved using a perforated plate having a plurality of perforations with a diameter of 2 to 20 mm. The tank 6 is provided with a level meter or load cell for controlling the fluid level in the tank. The tank 6 is also provided at the bottom with a vacuum discharge pump 8, by means of which the compound is pumped from the tank 6 to a static mixer 9. The vacuum discharge pump 8 is gear type model SBLV by Shimazu Mfg. K.K., and the static mixer 9 is Sulzer model SMX by Sumitomo Heavy Machinery K.K. The thixotropy controlling agent is fed from a line 10 to the static mixer 9 where the agent is mixed with the compound into a homogeneous compound. A single or twin shaft closed mixer may be used instead of the static mixer. For the above-described reason, the contents should be maintained at a temperature below 80° C.

In the third step, the crosslinking agent and optionally, the condensation catalyst and other additives which are not added in the first and second steps are added to the silicone rubber compound which has been deaerated and to which the thixotropy controlling agent has been added, and the resulting compound is deaerated. More specifically, as shown in FIG. 1, the crosslinking agent, condensation catalyst and other additives which have not been added in the first and second steps are fed from a line 12 into a single or plural shaft mixer 11 capable of high speed continuous mixing where they are mixed with the compound into a homogeneous compound. Subsequently, the compound is remixed and deaerated in a mixer or agitator-equipped tank 13 having an enough mixing volume to allow the compound to reside therein for at least the desired time.

The mixer 11 used in the first stage of the third step may be selected from twin shaft closed paddle or screw type mixers or extruders, for example, KRC kneader (Kurimoto Iron Works K.K.), TEM (Toshiba Machinery K.K.), and SCR (Mitsubishi Heavy Industries K.K.), and single shaft high speed shear mixers, for example, Pipe Line Homomixer (Tokushu Kika Kogyo K.K.) and IKM (Inoue Mfg. K.K.). In the case of a #2 type KRC kneader used as the mixer 11, for example, while it is operated at 100 to 400 rpm, the base compound and necessary components which have not been added in the first and second steps are fed into the mixer where they are mixed until uniform. The mixer 11 has a water cooling jacket for effectively removing the heat of agitation. The residence time in the mixer in the third step is variable by controlling the throughput speed. For higher productivity, the compound should be passed over in a short time. If the residence time required for uniform mixing of the base oil with the additives is 30 seconds, the deaerated compound would become so hard that working efficiency may become low. That is, after a cartridge is filled with the product, the product cannot be smoothly discharged from the cartridge. If the residence time is 150 seconds, then the discharging of the product from a cartridge becomes smooth. To satisfy the properties (ease of discharging) of the product and productivity, the mixer 13 should preferably have a volume corresponding to a residence time of at least 2 minutes. For example, a single shaft mixer having anchor shaped agitating blades, having an effective volume of 10 liters and operable at 50 rpm is commercially available from Shin-Etsu Engineering Co., Ltd. By passing the compound through such a mixer, a product having satisfactory properties can be obtained at a high production rate. Instead of such a mixer inserted in the mixing line, a deaerating tank for the final product may be modified so as to achieve similar agitation for a similar residence time, achieving a similar improvement in discharging from cartridges.

Preferably in the third step, the compound is passed through the mixer 11 within a residence time of 20 to 360 seconds, especially 30 to 150 seconds and through the mixer or agitator-equipped tank 13 within a residence time of at least 1 minute, especially 1 to 10 minutes.

Also in the third step, the mixer or agitator-equipped tank 13 is sealed with nitrogen during a quiescent period so that the composition with satisfactory properties may be obtained from immediately after the restart of operation.

The thus obtained silicone rubber compositions are filled in containers such as cartridges and tubes and used, for example, as adhesives, filling compounds, potting agents, and water-proof seals for building, electric, electronic, sanitary, transportation means and automotive engine part applications.

EXAMPLE

Examples of the invention are given below by way of illustration and not by way of limitation.

Example 1

In the system shown in FIG. 1, the flow jet mixer 1 was operated at 900 rpm and the KRC kneader 11 operated at 400 rpm. First, an α, ω-dihydroxyorganopolysiloxane having a viscosity of 20,000 cs at 25° C. and hydrophobic silica (BET specific surface area 120 m²/g) were fed to the flow jet mixer 1 of the first step at a rate of 75 kg/hr and 9.5 kg/hr, respectively, forming a base compound. The base compound was deaerated in the debubbling tank 6 and introduced into the static mixer 9 where a polyether was fed at a rate of 0.5 kg/hr. Then in the KRC kneader 11 of the third step, a curing agent composed mainly of methyl-triacetoxysilane and organic tin was fed at a rate of 7.0 kg/hr. The compound was then fed to the after mixer 13 (a single shaft mixer having anchor shaped agitating blades and operable at 50 rpm, Shin-Etsu Engineering Co., Ltd.) where the compound was deaerated. This process was continued for 2 hours. The load power of the flow jet mixer was 2.3 kW and the temperature of the final product was 48° C.

The residence time was 40 seconds in the flow jet mixer 1, 210 seconds in the debubbling tank 6, 34 seconds in the static mixer 9, 30 seconds in the KRC kneader 11, and 390 seconds in the after mixer 13.

The product emerging from the KRC kneader of the third step was sampled after 60 minutes of operation (designated Sample 1). The product emerging from the after mixer of the third step was sampled after 65 minutes of operation (designated Sample 2).

These two samples were anti-sagging. After deaeration, the samples were filled in plastic cartridges of 330 ml so carefully as to avoid air entry. Each cartridge was provided at the open end with a nozzle cut to a diameter of 5 mm. Using an air gun, the cartridge was pressed under a pressure of 2 kg/cm² gage for 5 seconds to discharge the sample, the weight of which was measured. Sheets of 2 mm thick were formed from the samples and cured for one week in a constant temperature/constant humidity chamber before the rubber sheets were measured for hardness. The results are shown in Table 1.

TABLE 1

|  | Discharged amount (g) | Cured hardness (JIS-A) |
|---|---|---|
| Sample 1 | 28 | 34 |
| Sample 2 | 44 | 34 |

Example 2

The process was carried out in the same system under the same conditions as in Example 1 except that the amounts of the components added were increased by a factor of 1.5. The load power of the flow jet mixer was 3.4 kW which is within its rating (3.7 kW). Stable operation was ensured in the KRC kneader too. The final product showed properties equivalent to Example 1.

For comparison purposes, the polyether, to be added in the second step, was fed in the first step. Under the same operating conditions as in Example 1, the load power of the flow jet mixer was 3.3 kW which is within its rating (3.7 kW). When the amounts of the components added were increased 30%, the load power of the mixer exceeded its rating and the operation was interrupted.

Example 3

After the process of Example 1 was over, the system was allowed to stand for 3 days, with the debubbling tank sealed under nitrogen and the remaining units left as such. Thereafter, the continuous operation was restarted. The product (designated Sample 3) obtained immediately after the restart was examined for outer appearance and properties, with the results being shown in Table 2.

TABLE 2

|  | Outer appearance | Discharged amount (g) | Cured hardness (JIS-A) |
|---|---|---|---|
| Sample 3 | good | 40 | 35 |

According to the invention, an RTV silicone rubber composition having anti-sagging properties can be continuously produced in an efficient manner. The composition obtained is improved in applicability.

Japanese Patent Application No. 173204/1997 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

We claim:

1. A continuous process for producing a room temperature vulcanizable silicone rubber composition, comprising:

a first step of mixing a crosslinkable organopolysiloxane oil with an inorganic filler to form a flowing silicone rubber compound, a second step of feeding the silicone rubber compound into a tank equipped at the bottom with a vacuum discharge pump and maintained in vacuum where the compound is continuously deaerated, and then adding and mixing a thixotropy controlling agent with the compound, and a third step of adding and mixing a crosslinking agent with the silicone rubber compound, followed by degassing.

2. The process of claim 1 wherein the first step is carried out at a temperature of not higher than 80° C.

3. The process of claim 2 wherein the second step is carried out at a temperature of not higher than 80° C.

4. The process of claim 1 wherein in the third step, the crosslinking agent and optionally, a condensation catalyst are first added and homogeneously mixed with the compound in a mixer capable of continuous mixing at a high speed, and thereafter, remixing and degassing are performed in a mixer or agitator-equipped tank having a mixing volume large enough to provide at least the desired residence time.

5. The process of claim 4 wherein in the third step, the compound is degassed in a mixer having a large enough volume to provide a residence time of at least 2 minutes.

6. The process of claim 1, wherein in the first step, said organopolysiloxane oil is of formula (I)

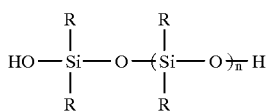

(1)

wherein

R is the same or different and is a substituted or unsubstituted monovalent hydrocarbon having 1 to 18 carbons, and n is a number which allows said organopolysiloxane to have a viscosity of 10 to 1,000,000 centistokes at 25° C.

7. The process of claim 6, wherein R in formula (I) is a monovalent hydrocarbon of 1 to 6 carbons.

8. The process of claim 7, wherein R is alkyl, cycloalkyl, alkenyl, aryl, or aralkyl, in each of which some or all of the hydrogens are optionally replaced by halogen.

9. The process of claim 8, wherein R is methyl, ethyl, propyl, butyl, hexyl, cyclohexyl, vinyl, allyl, propenyl, butenyl, phenyl, tolyl, naphthyl, or benzyl, and said halogen is chlorine or fluorine.

10. The process of claim 6, wherein n is a number which allows said organopolysiloxane to have a viscosity of 500 to 100,000 centistokes at 25° C.

11. The process of claim 1, wherein in said first step, said inorganic filler is silica which has a BET specific surface area of at least 40 m²/g, or calcium carbonate which has a specific surface area of at least 25 m²/g.

12. The process of claim 11, wherein said silica is mixed with said organopolysiloxane oil in a weight/weight ratio of 5 to 30: 100.

13. The process of claim 11, wherein said calcium carbonate is colloidal calcium carbonate which has been treated with a resin acid or with 2.0 to 10% by weight of a saturated fatty acid having at least 11 carbons, and wherein said calcium carbonate is mixed with said organopolysiloxane oil in a weight/weight ratio of 20 to 120:100.

14. The process of claim 1, wherein in the second step, said thixotrophy controlling agent is ethylene oxide or propylene oxide, and the weight/weight ratio of said thixotrophy controlling agent to said organopolysiloxane oil is 0.005 to 5:100.

15. The process of claim 1, wherein in the third step, said crosslinking agent is an organic silicon compound having at least two hydrolyzable groups, or a partial hydrolysate thereof, and wherein the weight/weight ratio of said crosslinking agent to said organopolysiloxane oil is 2 to 20:100.

16. The process of claim 1, wherein the first step is carried out at a temperature of not higher than 60° C.

17. The process of claim 1, wherein the compound made in the first step as a viscosity of 500 to 3,000 centipoise at 25° C.

18. The process of claim 4 wherein in the third step, the compound is degassed in a mixer having a large enough volume to provide a residence time of 1 to 10 minutes.

* * * * *